No. 624,831. Patented May 9, 1899.
L. L. LOGAN.
CAR BRAKE.
(Application filed Oct. 20, 1898.)
(No Model.)

Witnesses.
Robert Everett
F. B. Reefer

Inventor.
Lavalette Lasea Logan.
By James L. Norris
Atty.

THE NORRIS PETERS CO., PHOTO-LITHO., WASHINGTON, D. C.

UNITED STATES PATENT OFFICE.

LAVALETTE L. LOGAN, OF SCRANTON, PENNSYLVANIA.

CAR-BRAKE.

SPECIFICATION forming part of Letters Patent No. 624,831, dated May 9, 1899.

Application filed October 20, 1898. Serial No. 694,122. (No model.)

*To all whom it may concern:*

Be it known that I, LAVALETTE L. LOGAN, a citizen of the United States, residing at Scranton, in the county of Lackawanna and State of Pennsylvania, have invented new and useful Improvements in Car-Brakes, of which the following is a specification.

My invention relates to car-brakes, and more especially to brakes for mine-cars; and it consists in the features of construction and novel combinations of parts in a brake, as hereinafter described and claimed.

Figure 1:
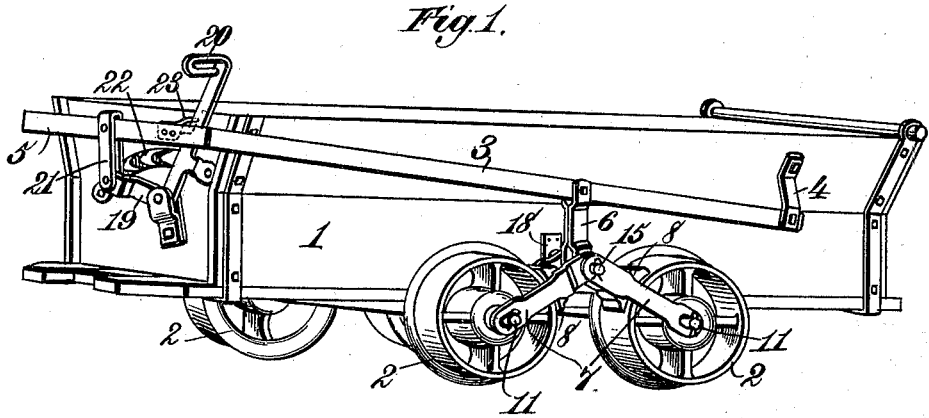
Figure 2:
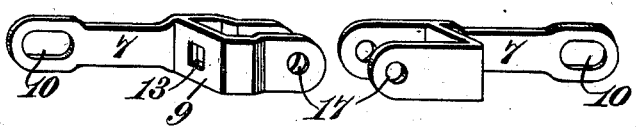
Figure 3:
Figure 4:
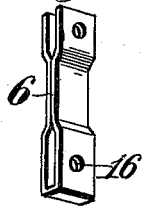
Figure 5:
Figure 6:
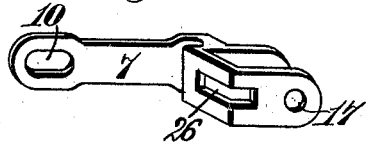
Figure 7:
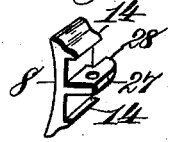
Figure 8:
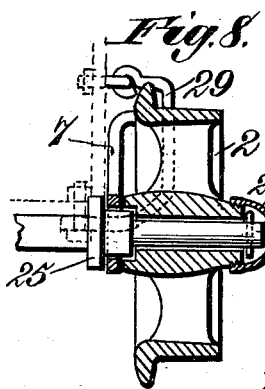
Figure 9:

In the annexed drawings, illustrating the invention, Figure 1 is a view of a mine-car provided with my improved brake. Fig. 2 is a view of a pair of radial arms or toggle-levers to carry the brake-shoes. Fig. 3 shows a brake-shoe detached. Fig. 4 is a view of a link or pendant that connects the radial arms or brake-levers with a main operating-lever. Fig. 5 is a pin for pivotally connecting the brake-levers and their supporting-link. Fig. 6 shows a modification of the brake-lever or radial arm. Fig. 7 is a view of a brake-shoe provided with a modified form of attaching-lug. Fig. 8 is a transverse section through a car-wheel with its axle arranged for attachment of a brake-lever or radial arm at the inner side of the wheel. Fig. 9 is a view of a guard or guide for the brake-levers.

The numeral 1 designates a mine-car mounted on a truck of four wheels 2 and arranged for the application of brakes between the forward and rear wheels on each side of the car. Each side of the car is provided with a main brake-operating lever 3, Fig. 1, having one end fulcrumed to a bracket 4, secured to the side of the car near or toward its forward end. The levers 3 on opposite sides of the car are connected at their rear ends by a cross-bar 5, extended across the hind part of the car. At a point above and between the car-wheels each lever 3 has pivoted thereto a depending link 6, the lower end of which is constructed for the pivotal attachment of two radial arms or toggle-levers 7, to which the brake-shoes 8 are attached. These radial arms or brake-levers 7 are bifurcated at the ends which are pivoted to the link 6, and one arm of each bifurcation is offset from the side of the lever to form a shoulder 9, Fig. 2, for attachment and support of the brake-shoe.

The other end of each brake-lever 7 is provided with an elongated slot 10, the ends of which are concaved or rounded to correspond with the peripheral curvature of the axle-spindle 11, on which the said slotted ends of the levers 7 are loosely supported. The width of the elongated slots 10 is just enough to permit them to slip over the axle ends, and the length of each slot should be such as will allow just enough radial motion of the levers 7 as will compensate for wear of the brake-shoes 8 and provide a clearance between the shoes and the treads of the wheels when the brakes are released and also to prevent injury to the shoulders of such radial arms from which the shoes may have been detached.

The brake-shoes 8 may be made from wood or iron or other material. When made from iron or other metal, they are preferably each provided on the attaching side with a lug 12, Fig. 3, that is formed to enter and fit closely into a correspondingly-shaped opening 13, Fig. 2, provided in the shoulder 9 of each brake-lever or radial arm. A pin or other fastening applied to the lug 12 will serve to secure the brake-shoe to its lever in such manner as to be readily detachable. If a brake-shoe of wood is employed, it may be fastened to the shoulder 9 of the lever 7 by means of nails or other fastenings passed through a suitable number of holes provided for that purpose in the shouldered portion of the lever. The attaching side of each brake-shoe is preferably recessed and provided with flanges 14 to fit over the shouldered portion of the lever 7 at top and bottom, so as to effectually prevent any tendency to turning or twisting of the brake-shoe and hold it secure and rigid.

The pivotal joints formed by the radial arms 7 with their supporting-links 6 on each side of the car should be made sufficiently wide to be intersected by a line drawn through the center of the rubbing or braking surface of the shoe and a point common to the center line of the axle and the plane of that side of the slotted portion of the radial arm next the wheel. In order to provide these joints, the bifurcated ends of the radial arms or levers 7 are so formed that one arm of each bifurcation will be offset from the main portion of the lever, as shown in Fig. 2, and the link 6 will be widened at its lower end, as shown in Fig. 4, or in any suitable manner, the object being to give a stable support against the forces tending to twist the radial arms or any forces tending to rotate them about a line drawn through the center of the supporting-surfaces of said arms on the axles. These joints between the links 6 and levers 7 being made wide will better resist the lateral stresses to which the said levers or radial arms are subjected. The arms or levers 7 are held in place on the axles by means of linchpins or otherwise.

The depending link 6 and the radial arms or brake-levers 7 are pivotally connected by means of a pin 15, Figs. 1 and 5, about which the said link and levers can turn. The said link and levers are provided, respectively, with holes 16 and 17, through which the pin 15 is passed. The head of this pin 15 may have a bearing-surface provided therefor by a middle rib of the car or by a sheet-iron or other plate 18, secured to the side of the car. This will prevent the radial arms or levers 7 from rubbing against the sides of the wheels by resisting the forces tending to turn said arms about a line joining the central points of the supports of said arms on the axles.

The main brake-levers 3 are operated through a bell-crank lever 19, that is fulcrumed to one end of the car and provided with an operating-handle 20, Fig. 1. The short arm of the bell-crank lever 19 connects, through a link 21, with the cross-bar 5 of the levers 3, through which the brakes are actuated. A ratchet 22 is arranged in position to be engaged by the lever 19 for the purpose of holding said lever in place when the brakes are on or applied to the wheels, and on the cross-bar 5 there may be arranged a catch 23 to engage and hold said lever when the brakes are off.

When the brakes are released or let off, the extreme ends of the slots 10 are held tightly against the axles, and this prevents the brake-shoes from striking against the treads of the wheels while the car is in motion and keeps the parts of the brake rigidly in place. When the brake is applied, the other or inside ends of the slots 10 in such arms 7 as may have no shoes attached (or where the shoes are worn down to their limit) will come against the axles, and thus serve as stops to prevent wear on the shouldered shoe-attaching parts of the levers 7 and at the same time will force the application of such shoes as may be in use. Thus one or more brake-shoes can be effectively operated without injury to those arms or levers 7 that may be without shoes.

The radial arms 7 will assume different radial positions when the brakes are applied to the wheels, depending upon the degree of wear to which the shoes may have been subjected. Thus the more the shoes are worn the more nearly horizontal will be the position assumed by the arms or levers 7 and the greater is the mechanical advantage of the brake. The radial arms or levers 7 also operate the shoes 8 in such manner that the whole of the rubbing or braking surface of each shoe is applied to or removed from the tread of the wheel at the same instant.

In some instances, as when the wheels are provided with hub-caps 24, Fig. 8, the brake-levers or radial arms 7 are placed on the axles at a point between the wheels and the side of the car. The slot in the lever or radial arm is large enough to be passed onto an enlarged portion of the axle between a fixed axle-collar 25 and the inner side of the wheel. This enlarged portion of the axle has its outer end partly set into the wheel-hub, and it forms between said hub and the collar 25 an annular groove that prevents the arm or lever from dropping between the wheel and the adjacent enlarged portion of the axle. In order to avoid removing the wheels to permit replacing of brake-shoes, the shouldered portion 9 of each arm or lever 7 will be formed with an open-ended slot 26, Fig. 6, to readily receive a laterally-extended lug 27, Fig. 7, that is provided on the attaching side of the brake-shoe. The shoe may be secured by passing a pin through this lug 27 or by any suitable fastening, and, if desired, the lug may be provided with an offsetting portion 28 to brace it against the shouldered portion of the lever or radial arm.

A guard or guide 29, Figs. 8 and 9, may be placed between the bifurcations of a radial arm and fastened to the side of the car next or alongside the lever-suspending link 6 in such manner as to permit some lateral motion. This guide 29 confines the levers or radial arms in such manner as to resist all forces tending to rotate the radial arms about a line passing through the central points of the supporting-surface of said arms on the axles, thereby preventing the sides of the radial arms from pressing against the inner sides of the wheels. A similar guide can be used when the radial arms are on the outside of the wheels, providing it is desired to relieve the arms of considerable lateral stress, whereby lighter arms or levers can be employed.

Although I have shown the radial brake-arms or toggle-levers 7 as suspended above the plane of the car-axles, I would have it understood that they may be arranged at a lower point or below the plane of the axles, and they may be pivotally supported by any suitable means that will permit a ready operation or control of the brakes.

Obviously the brake mechanism can be put on but one side of the car, if preferred, any suitable rack or other lock being provided to hold the main operating-lever 3 in the position required.

What I claim as my invention is—

1. In a car-brake, the combination of a pair of pivotally-connected brake-levers or radial arms suspended by their jointed ends between the forward and rear car-wheels and having their outer ends slotted, supports engaging the outer slotted ends of said radial arms, brake-shoes carried by said radial arms between their inner jointed ends and their outer slotted ends, and operating mechanism for said radial arms or levers, substantially as described.

2. In a car-brake, the combination of connected main brake-operating levers located on opposite sides of a car, links suspended from said main levers between the forward and rear car-wheels, jointed brake-levers having their jointed ends suspended from said links and their outer ends supported on the wheel-axles, and brake-shoes carried by said jointed brake-levers, substantially as described.

3. In a car-brake, the combination of main brake-operating levers fulcrumed at each side of the car and connected with each other at one end, links suspended from said main levers, jointed brake-levers or radial arms pivotally suspended from said links between the car-wheels and having their outer ends slotted and supported on the wheel-axles, brake-shoes carried by said radial arms or levers, and means for preventing the said radial arms from pressing against the sides of the car-wheels, substantially as described.

4. In a car-brake, the combination of brake-levers or radial arms provided with laterally-widened and pivotally-connected ends suspended between the forward and rear car-wheels and having their outer ends slotted and supported on the wheel-axles, brake-shoes carried by the widened portions of said radial arms or levers, mechanism for operating said radial arms or levers with a radial movement, and means for preventing the said radial arms or levers from pressing against the sides of the car-wheels, substantially as described.

In testimony whereof I have hereunto set my hand in presence of two subscribing witnesses.

LAVALETTE L. LOGAN.

Witnesses:
WM. A. WILCOX,
THOS. N. THOMSON.